United States Patent
Samson

(10) Patent No.: US 11,277,727 B1
(45) Date of Patent: Mar. 15, 2022

(54) INTERNET OF THINGS COMMUNICATION SERVICE

(71) Applicant: T-MOBILE INNOVATIONS LLC, Overland Park, KS (US)

(72) Inventor: Kenneth W. Samson, Belton, MO (US)

(73) Assignee: Sprint Communications Company L.P., Overland Park, KS (US)

(*) Notice: Subject to any disclaimer, the term of this patent is extended or adjusted under 35 U.S.C. 154(b) by 53 days.

(21) Appl. No.: 16/932,209

(22) Filed: Jul. 17, 2020

(51) Int. Cl.
- H04W 4/00 (2018.01)
- H04W 4/80 (2018.01)
- H04W 88/06 (2009.01)
- H04L 67/14 (2022.01)
- H04W 48/18 (2009.01)

(52) U.S. Cl.
CPC .............. *H04W 4/80* (2018.02); *H04L 67/14* (2013.01); *H04W 48/18* (2013.01); *H04W 88/06* (2013.01)

(58) Field of Classification Search
CPC ....... H04W 4/80; H04W 88/06; H04W 48/18; H04L 67/14
USPC .......................................................... 370/331
See application file for complete search history.

(56) References Cited

U.S. PATENT DOCUMENTS

| | | | | |
|---|---|---|---|---|
| 7,574,821 B2* | 8/2009 | Furem | ..................... | E02F 3/434 172/2 |
| 9,633,493 B2* | 4/2017 | Raina | ....................... | G07C 9/28 |
| 10,212,544 B2* | 2/2019 | Liu | ......................... | H04W 4/12 |
| 10,326,876 B1* | 6/2019 | Gailloux | ............. | H04M 3/2227 |
| 10,469,650 B1* | 11/2019 | Gailloux | ............. | H04M 3/5191 |
| 10,791,461 B1* | 9/2020 | Gailloux | ............... | H04W 12/73 |
| 10,805,786 B2* | 10/2020 | Pellegrini | ............ | G08B 25/016 |
| 10,860,965 B2* | 12/2020 | Groseclose | ............ | G06Q 10/08 |
| 10,917,766 B1* | 2/2021 | Gailloux | ................. | H04W 4/60 |
| 2007/0165572 A1* | 7/2007 | Lenzarini | ............... | H04L 69/162 370/331 |
| 2012/0233315 A1* | 9/2012 | Hoffman | ............... | G06F 9/5072 709/224 |
| 2012/0271949 A1* | 10/2012 | Radhakrishnan | ..... | H04L 67/322 709/226 |
| 2013/0214909 A1* | 8/2013 | Meijers | ................. | H04W 4/029 340/10.5 |
| 2013/0217332 A1* | 8/2013 | Altman | ................. | H04W 4/025 455/41.2 |
| 2014/0378163 A1* | 12/2014 | Dicke | ................... | H04W 68/00 455/456.2 |
| 2015/0363481 A1* | 12/2015 | Haynes | ................. | G06Q 10/10 707/748 |
| 2018/0018618 A1* | 1/2018 | Groseclose | ........ | G06Q 10/0833 |

(Continued)

Primary Examiner — Marceau Milord

(57) ABSTRACT

Disclosed is a method of gathering data from a wireless data device that isn't connected to the internet using a mobile device like a phone, laptop, or tablet. The wireless data device signals an device monitoring application on the smartphone to connect. The device monitoring application and the wireless data device trade passwords to establish a secure wireless connection. The data is sent from the wireless data device to the smartphone and stored in memory. The device monitoring application connects wirelessly to the internet through a cell tower. If cell service is not available, the device monitoring application waits till cell service is available to connect to the internet. The device monitoring application on the smartphone establishes a secure connection to a server located on the internet and sends the data to an device monitoring application executing on the server.

20 Claims, 11 Drawing Sheets

(56) References Cited

U.S. PATENT DOCUMENTS

2018/0032997 A1* 2/2018 Gordon .............. G06Q 30/0269
2019/0349426 A1* 11/2019 Smith ..................... H04W 4/70
2020/0314240 A1* 10/2020 Leavitt .................... H04L 67/20

* cited by examiner

INTERNET OF THINGS COMMUNICATION SERVICE

CROSS-REFERENCE TO RELATED APPLICATIONS

None.

STATEMENT REGARDING FEDERALLY SPONSORED RESEARCH OR DEVELOPMENT

Not applicable.

REFERENCE TO A MICROFICHE APPENDIX

Not applicable.

BACKGROUND

Bluetooth® is used as a short-range wireless communication protocol for beacons. A beacon is a small battery-powered device used to alert consumers of a message or communication from a business or retailer. These devices are often placed in locations to target consumers. Beacons use a low power short-range wireless communication protocol such as Bluetooth, Bluetooth® low energy (BLE), and Bluetooth Smart. Many mobile communication devices, such as smartphones, tablets, and wearable devices, support short-range wireless communication protocols. A beacon can alert a mobile communication device of a message or communication by connecting to the mobile communication device.

Wireless data devices may gather data from the appliances or equipment they are connected to. These wireless data devices may not have a connection with a cell site to obtain a wireless communication link from the cell site and access to the radio access network that the cell site is a part of.

SUMMARY

In an embodiment, a method of communicating data from a wireless device is disclosed. The method comprises receiving a wireless signal with a device monitoring application executing on a mobile communication device from a wireless data device with a first wireless communication protocol, establishing a communication session by the device monitoring application with the wireless data device, receiving one or more data sets by the device monitoring application from the wireless data device, wherein one or more data sets comprises periodic data gathered by the wireless data device, storing the one or more data sets received from the wireless data device in non-transitory memory on the mobile communication device, and sending a message, by the device monitoring application, to the wireless data device, wherein the message comprises an instruction. The method further comprises connecting the mobile communication device with a second wireless communication protocol to a receiver communicatively coupled to a network, establishing a communication session by the device monitoring application with a server communicatively coupled to the network, and sending the stored data from the mobile communication device to the server.

In another embodiment, a method of communicating data from a wireless device is disclosed. The method comprises broadcasting a wireless signal from an device monitoring application executing on a mobile communication device to a wireless data device with a first wireless communication protocol, establishing a communication session by the device monitoring application with the wireless data device, receiving one or more data sets by the device monitoring application from the wireless data device, wherein the one or more data sets comprise periodic data gathered by the wireless data device, storing the data received from the wireless data device in non-transitory memory on the mobile communication device, and sending a message by the device monitoring application to the wireless data device, wherein the message indicates that the one or more data sets have been received by the device monitoring application, whereby the wireless data device learns that the one or more data sets have been received and whereby the wireless data device deletes the one or more data sets and stops beaconing to initiate a communication session until another one or more sets of data have been gathered by the wireless data device. The method further comprises connecting the mobile communication device with a second wireless communication protocol to a receiver communicatively coupled to a network, establishing a communication session by the device monitoring application with a server communicatively coupled to the network, and sending the stored data from the mobile communication device to the server.

In yet another embodiment, a method of communicating data from a wireless device is disclosed. The method comprises transmitting data from a first wireless data device to a second wireless data device with a first wireless communication protocol, receiving a wireless signal with an device monitoring application executing on a mobile communication device from the second wireless data device with the first wireless communication protocol, establishing a communication session by the device monitoring application with the second wireless data device, receiving data by the device monitoring application from the second wireless data device, and storing the data received from the second wireless data device in non-transitory memory on the mobile communication device. The method further comprises connecting the mobile communication device with a second wireless communication protocol to a receiver communicatively coupled to a network, establishing a communication session by the device monitoring application with a server communicatively coupled to the network, and sending the stored data from the mobile communication device to the server.

These and other features will be more clearly understood from the following detailed description taken in conjunction with the accompanying drawings and claims.

BRIEF DESCRIPTION OF THE DRAWINGS

For a more complete understanding of the present disclosure, reference is now made to the following brief description, taken in connection with the accompanying drawings and detailed description, wherein like reference numerals represent like parts.

DETAILED DESCRIPTION

Figure 1:
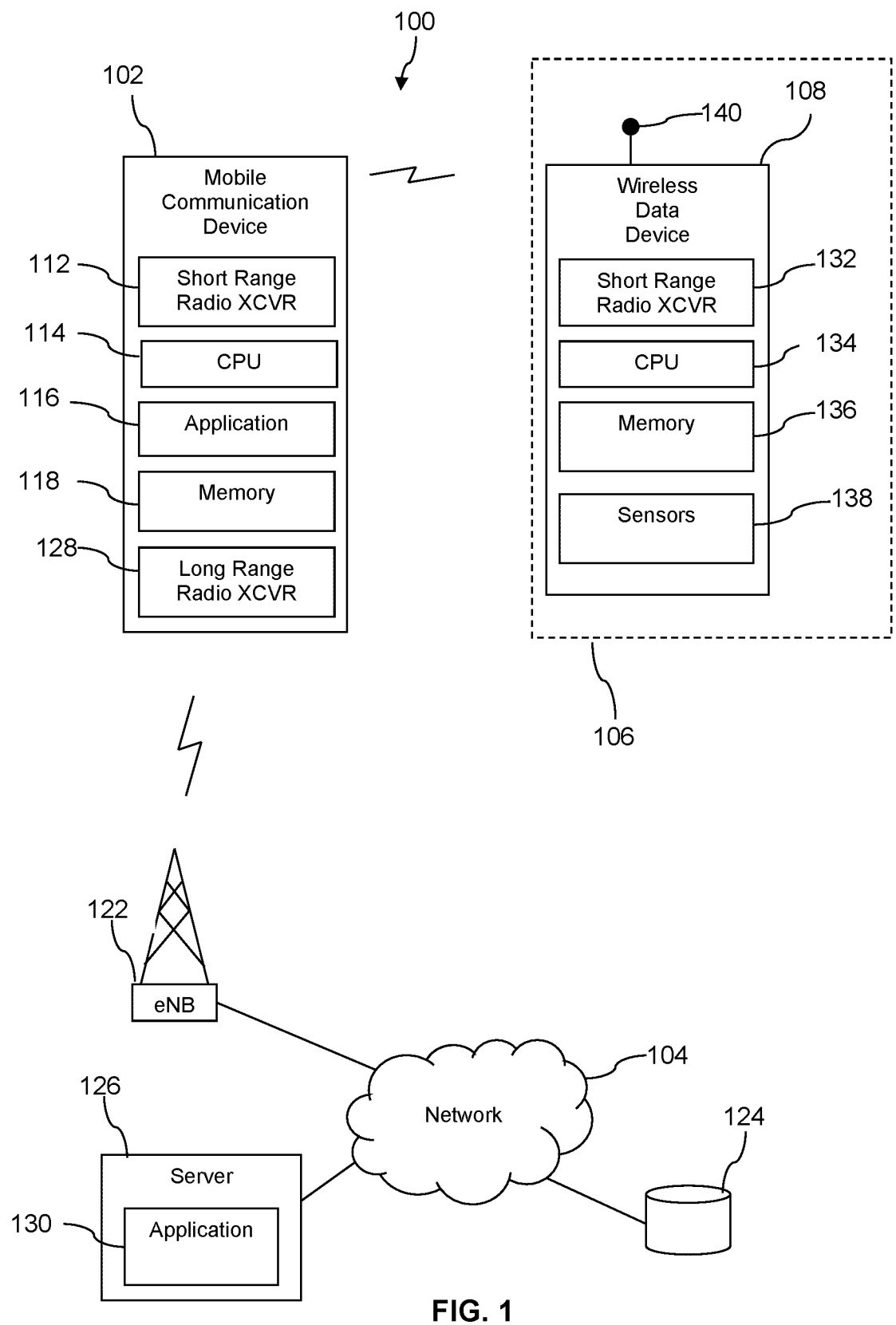
FIG. 1 is a block diagram of a communication system according to an embodiment of the disclosure.

It should be understood at the outset that although illustrative implementations of one or more embodiments are illustrated below, the disclosed systems and methods may be implemented using any number of techniques, whether currently known or not yet in existence. The disclosure should in no way be limited to the illustrative implementations, drawings, and techniques illustrated below, but may be modified within the scope of the appended claims along with their full scope of equivalents.

The term Internet of Things (IoT) is based on the idea that everyday objects, not just computers, can be readable, recognizable, locatable, addressable, and controllable via a wireless communication link with a wireless network or connected to the internet. IoT devices can monitor equipment while connected to a wireless network. A wireless data device may be an IoT device that isn't connected to a wireless network. A company may want to log data from equipment or a device in a location without a wireless connection to a network but is routinely accessed by company personnel. For example, a vending company may place a vending machine in the basement of a business, a stadium owner may place an environmental monitoring device in the bottom of a stadium, a farmer may place a weather monitoring system out in a field, a rancher may place a gate access monitoring device in a remote location, or a landowner may place a game camera to capture wildlife or monitor people accessing his property. In each of these examples, the wireless data device may be gathering periodic data from sensors. The wireless data devices may monitor for a wireless signal rather than broadcast a wireless beacon to save power or to remain undiscovered. A mobile communication device may send a wireless signal from a device monitoring application loaded in memory using a short-range wireless communication protocol. The wireless data device may recognize the wireless signal and send a wireless signal to the mobile communication device. The device monitoring application may exchange passwords with the wireless data device to establish a secure communication session. The wireless data device may be a standalone system or may be integrated into another device. The wireless data device may be in a fixed location or mounted to a movable object. The wireless data device may collect data from the environment, equipment, other wireless data devices, or mobile communication devices. The mobile communication device may store the identification, data, and instructions in memory. The mobile communication device may determine the location of the wireless data device and store the location in memory. The mobile communication device may establish a secure connection to a server via a cell site and network to transfer the data to a monitoring application on the server. In an embodiment, after the mobile communication device stores the information received from the wireless data device, the mobile communication device may send a message or other indication of having received and stored the information to the wireless data device. The wireless data device may then delete the subject information and/or stop trying to handover the information to another mobile communication device.

In an embodiment, a company may place one or more wireless data devices with beacons that become active beacons when a device condition is met. For example, a device may produce an active beacon when the device is full or empty or open or closed. The wireless data device may log an event along with the date and time of the event. The wireless data device may also log environmental data at a specified time interval. The mobile communication device may prompt the user for permission to interact with the device, or the interaction may occur in the background without the user's knowledge. In the case of wireless data device in a fixed location, the interaction with the wireless data device may determine the location of the user with the mobile communication device. In the case of the wireless data device on a movable object, the location of the wireless data device may be determined with the location of the user with the mobile communication device. For example, a vehicle, a car, motorcycle, or bicycle, may have a wireless data device that becomes an active beacon when the vehicle becomes stolen. The wireless data device may collect data from the environment, equipment, other wireless data devices, or mobile communication devices. The wireless data device may establish a secure connection with the application active on the mobile communication device to exchange identification, data, and instructions. The mobile communication device may send a message containing data or instructions to the wireless data device. For example, in a warehouse with multiple wireless devices, the mobile communication device may indicate that the data has been received and the wireless data device can deactive the beacon. The wireless communication device can deactive each beacon after the data has been downloaded. The mobile communication device may determine the location of the wireless data device and store the location in memory. The mobile communication device may establish a secure connection to the server via a cell site and network to transfer the data to a monitoring application on the server.

In an embodiment, a wireless data device may be located on a movable object such as a delivery man, a bicycle, a car, a truck, a commercial vehicle, or a movable cart. The wireless data device may establish a secure connection with other wireless data devices to send, receive, or exchange data. The wireless data device may be attached to a movable object that exchanges data from stationary objects or other movable objects. The movable wireless data device may establish a secure connection with an application active on a mobile communication device and to exchange identification, data, and instructions. The mobile communication device may store the identification, data, and instructions in memory. The mobile communication device may establish a secure connection to the server via a cell site and network to transfer the data to a monitoring application on the server.

Turning now to FIG. 1, in an embodiment, a wireless communication system 100 includes a wireless data device 108 in communication with a mobile communication device 102 that may be communicatively connected to a server 126.

The wireless data device 108 may include a processor 134, a memory 136, a short-range radio transceiver 132, an antenna 140, and sensors 138. A portion of the memory 136 may be non-transitory memory and a portion of the memory 136 may be transitory memory. The wireless data device 108 may have a short-range radio transceiver 132 that may produce a Bluetooth® wireless signal or a WiFi wireless signal. Bluetooth® wireless signals are typically 2.402 GHz to 2.480 GHz short-range, low power wireless signals that follow a standard protocol managed by the Bluetooth® Special Interest Group (SIG). WiFi wireless signals commonly use the 2.4 GHz, 5 GHz, and 5.9 GHz short-range wireless signals that follow the IEEE 802.11 protocol family. Bluetooth® and WiFi share the 2.4 GHz band, so the short-range radio transceiver 132 may connect to both Bluetooth® and WiFi simultaneously. The wireless data device 108 may have a processor 134 running an application stored in memory 136 that utilizes the short-range radio transceiver 132 and monitors sensors 138. The wireless data device 108 may comprise sensors 138 or may monitor sensors 138 that are remotely attached. The wireless data device 108 may have an internal antenna 140 or external antenna 140.

The wireless data device 108 may gather periodic data sets from the sensors 138. The periodic data may comprise environmental data such as pressure, temperature, humidity, or noise level. The periodic data may comprise inventory data such as number of items, weight of material, or liquid level in tank. The periodic data may comprise event data such as on/off, open/close, in/out, or up/down. The wireless data device 108 may record the date and time of each event or change in inventory. The wireless data device may also collect the data at a time interval of one of milliseconds, seconds, minutes, hours, days, weeks, or months.

The mobile communication device 102 may establish a wireless link with the wireless data device 108 with a short-range radio transceiver 112. The mobile communication device 102 may be a smartphone, a mobile phone, a laptop computer, a tablet computer, a wireless handset, a personal digital assistant (PDA), a gaming device, a pager, a media player, or a computer. The mobile communication device 102 may include short-range radio transceiver 112, a processor 114, memory 118, one or more device monitoring applications 116, and long-range radio transceiver 128. The mobile communication device 102 may include a display, a touchscreen display having a touch-sensitive surface for input by a user, a keyboard for input by a user, or a microphone for audio input by a user. The device monitoring application 116 may be loaded in a non-transitory portion of the memory 118 and running in the background or require explicit instructions to connect. The short-range radio transceiver 112 may be able to establish wireless communication with Bluetooth, WiFi, or other low power wireless signals such as; ZigBee, Z-Wave, 6LoWPan, Thread, and WiFi-ah. The long-range radio transceiver 128 may be able to establish wireless communication with the cell site 122 based on a 5G, a long term evolution (LTE), a code division multiple access (CDMA), or a global system for mobile communications (GSM) telecommunications protocol.

The wireless data device 108 may transfer data to the mobile communication device 102 with a wireless communication link. When a wireless data device detects a mobile communication device 102, the wireless data device 108 may establish a secure encrypted communication link with the mobile communication device 102 utilizing the short-range radio transceiver 132 with an exchange of passwords. The wireless data device 108 may then utilize the processor 134 to transfer the data stored in memory 136 with the encrypted communication link to the device monitoring application 116 executing in memory 118 on the mobile communication device 102. The device monitoring application 116 may store the received data in non-transitory memory 118. The device monitoring application 116 may add data to the received data. The device monitoring application 116 may transmit data and instructions stored in non-transitory memory 118 through the encrypted communication link to the wireless data device 108. The wireless data device 108 may store the data and instructions in memory 136. The wireless data device 108 may execute a command with the processor 134 based on the instructions received.

The cell site 122 may provide a wireless communication link to the mobile communication device 102 and couple the mobile communication device 102 to the network 104. The cell site 122 may provide the wireless communication link using one or more of a code division multiple access (CDMA), a global system for mobile communications (GSM), a long term evolution (LTE), or a worldwide interoperability for microwave access (WiMAX) wireless protocol. When the mobile communication device 102 and the cell site 122 communicate according to LTE, the mobile communication device 102 may be referred to as a user equipment (UE) and the cell site 122 may be referred to as an enhanced node B (eNB).

The cell site 122 may provide the mobile communication device 102 a communication link to a network 104. The network 104 is one or more public networks, one or more private networks, or a combination thereof. The mobile communication device 102 may communicate via the cell site 122 and via the network 104 to a server 126 communicatively coupled to the network 104 and to a device servicing application 130 that executes on the server 126.

The communication link between the mobile communication device 102 and the server 126 may allow data to be transferred to the server 126. The data stored within the memory 118 of the mobile communication device 102 may be transferred with the device monitoring application 116 via the long-range radio transceiver 128 and the cell site 122 to the network 104 and to the device servicing application 130 running on the server 126. The device servicing application 130 may send the data through the network 104 to be stored on the data storage 124. The data received by the device servicing application 130 may include identification, data from sensors 138, location data from a mobile communication device 102, instructions, and data from other wireless data devices. The device servicing application 130 executing on server 126 may execute a command based on the data received or based on other input received. The device servicing application 130 may send data through the communication link to the device monitoring application 116 on the mobile communication device 102. The data may include instructions for the wireless data device 108 or the sensor 138.

Figure 2:
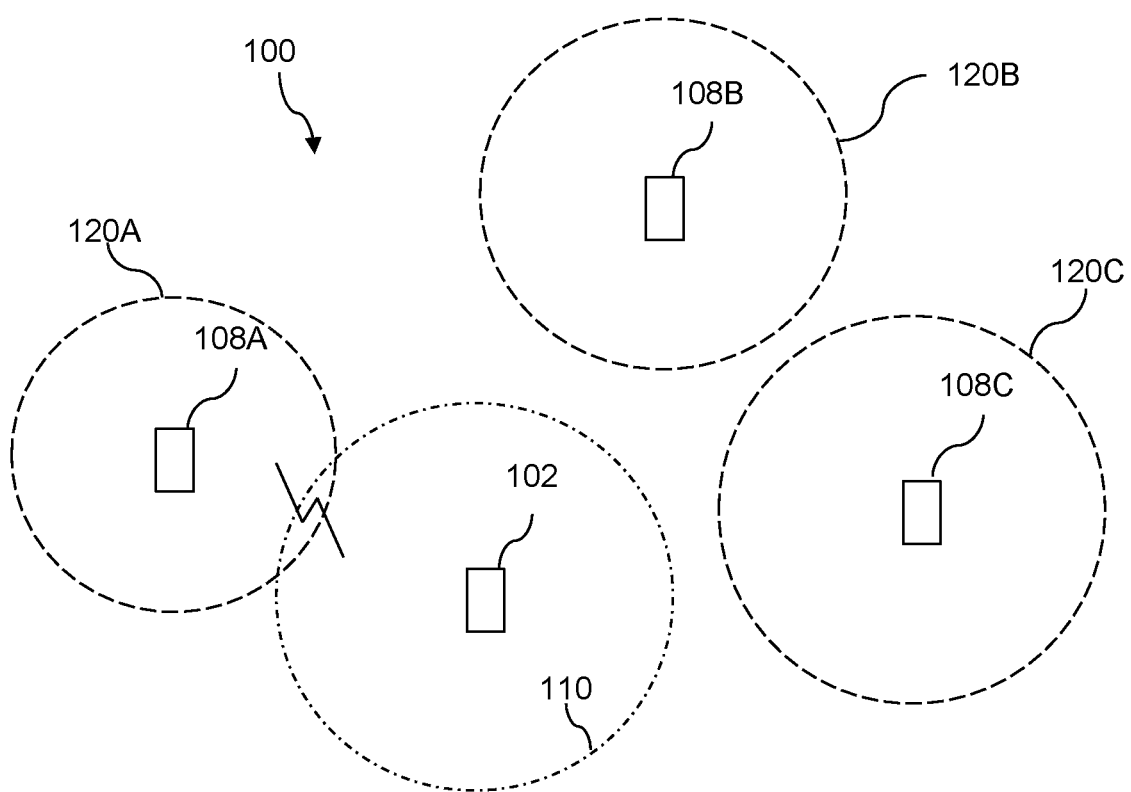
FIG. 2 is a block diagram of a communication system according to an embodiment of the disclosure.

Turning now to FIG. 2, the operation of a wireless communication system 100 is described. The area of coverage from the short-range radio transceiver 132 on the wireless data device 108 discussed in FIG. 1 may be represented by the dotted line circle 120. Likewise, the area of coverage 110 from the short-range radio transceiver 112 on the mobile communication device 102 may be represented by the dotted line circle. It is understood that in practice, the limits of short-range reception of the mobile communication device 102 and wireless data device 108 may not be circular but may be oval, asymmetrical, lopsided, or multi-lobed (like a cloverleaf). The idealized circle is an abstraction for purposes of discussion.

In an embodiment, the wireless data devices 108A, 108B, and 108C may be monitoring for a wireless signal from the mobile communication device 102. Although only the wireless data devices 108A, 108B, and 108C are shown, it is understood that the wireless data device 108 may be installed inside a monitored device 106, e.g., an appliance, equipment, enclosure, or connected to another device, without limiting the disclosure. As previously disclosed, the wireless data devices 108A, 108B, 108C may be collecting periodic data sets from the monitored device 106 and/or the environment. The wireless data devices 108A, 108B, and 108C may not be broadcasting a wireless signal from the short-range radio transceiver 132. The mobile communication device 102 may be broadcasting a wireless signal from the short-range radio transceiver 112. A communication link may not be established between mobile communication device 102 and wireless data device 108B and 108C because the area of coverage 120B and 120C from the wireless data device 108 does not intersect with or overlap the area of coverage 110 of the short-range radio transceiver 112 of the mobile communication device 102.

A communication link may be established when the area of coverage 120A from the wireless data device 108A intersects or overlaps the area of coverage 110 of the short-range radio transceiver 112 of the mobile communication device 102. The mobile communication device 102 may be sending out a wireless signal from the short-range radio transceiver 112. The wireless signal may be continuous or may be periodic. The wireless data device 108A may receive the wireless signal via the antenna 140 with the short-range radio transceiver 132. The wireless data device 108A may then send a wireless signal to the mobile communication device 102 to establish a communication link.

The communication link may be established by the wireless data device 108A sending a password to the mobile communication device 102. The mobile communication device 102 validates the password then sends a password to the wireless data device 108A. The wireless data device 108A validates the password then establishes a secure encrypted communication link and sends the data to the mobile communication device 102. The data from the wireless data device 108A may include identification, location, data gathered from sensors, data gathered from other wireless data devices, data gathered from other mobile communication devices, and instructions. The location data from the wireless data device 108A may be data given to the wireless data device 108A during setup or servicing. For example, the address data may be GPS coordinates, a physical address, mailing address, room number, machine number, or location description. The mobile communication device 102 may add data to the data received from the wireless data device 108A such as time, date, location, GPS data, and other data. The location data added by the mobile communication device 102 may be the current location of the mobile communication device 102. It is understood that the location of the mobile communication device 102 may serve as a proxy for the location of the wireless data device 108A when the mobile communication device 102 and wireless data device 108A are in short-range wireless communication with each other. The mobile communication device 102 may send location data and instructions to the wireless data device 108A. The wireless data device 108A may act on the instructions. For example, the wireless data device 108A may stop broadcasting for a specified time period, switch from active broadcasting to passive monitoring, switch from passive monitoring to active broadcasting, erase data stored, reset sensors 138, enter a sleep mode, or any other similar change in device status.

The mobile communication device 102 may establish a wireless communication link with the long-range radio transceiver 128 to a cell site 122 to transfer the data from the device monitoring application 116 to the server 126 via network 104. The cell site 122 may provide a wireless communication link to the mobile communication device 102 and couple the mobile communication device 102 to the network 104. However, the mobile communication device 102 may be outside of the range of the cell site 122 and unable to establish a wireless communication link at that immediate time. The mobile communication device 102 may store the data inside the non-transitory memory 118 until a wireless communication link can be established, for example, until a later time when the mobile communication device 102 has been moved into cellular coverage.

In an embodiment, the wireless communication system 100 may have a wireless data device 108 in a fixed location. The wireless data device may transmit the location data, e.g., GPS coordinates or physical addresses, as part of the data. In an embodiment, the wireless data device 108 may be mounted to a movable object. In an embodiment, the wireless data device 108 may be integrated into another monitored device 106: an appliance, a gate, a monitoring device, a video surveillance system, or any other device. In an embodiment, the wireless data device 108 may monitor sensors 138. The sensors 138 may be integrated into the wireless data device 108, or the sensors 138 may be remote sensors located away from the wireless data device 108. The sensors may monitor conditions such as pressure, temperature, humidity, water level, or other similar measurement devices.

Figure 3:
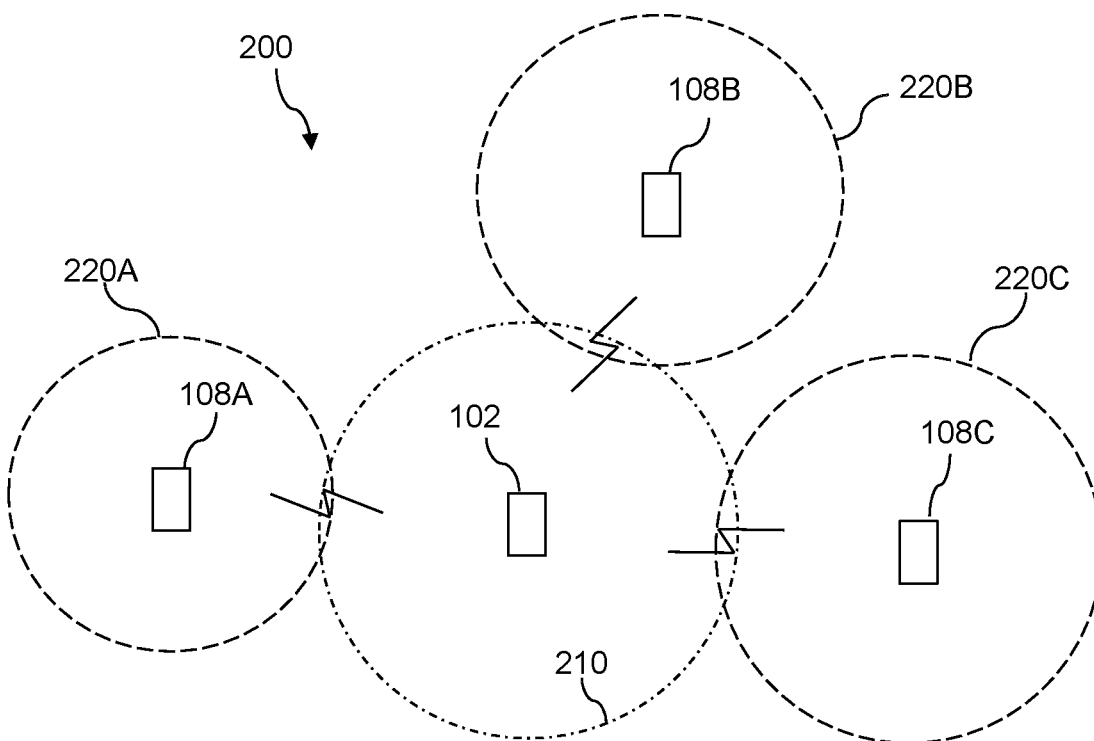
FIG. 3 is a block diagram of a communication system according to an embodiment of the disclosure.

Turning now to FIG. 3, an embodiment of the wireless communication system 200 with multiple wireless data devices 108 is described. A mobile communication device 102 may move into an area with multiple wireless data devices 108A, 108B, and 108C. Although three wireless data devices are shown, any number of wireless data devices may be present. Although only the wireless data device 108 is illustrated, it is understood that the wireless data devices 108A, 108B, and 108C may be installed inside a monitored device 106, an appliance, equipment, or connected to another device without limiting the disclosure. The area of coverage 210 from the short-range radio transceiver 112 on the mobile communication device 102 discussed in FIG. 1 and FIG. 2 may be represented by the dotted line circle. Likewise, the area of coverage 220A, 220B, and 220C from the short-range radio transceiver 132 on the wireless data devices 108A, 1086, and 108C may be represented by the dotted line circles.

The wireless data devices 108A, 108B, and 108C may be periodically or continuously signaling a request to establish a wireless connection with a mobile communication device 102. One or more of the wireless data devices 108 may begin wireless signaling after a condition is met: e.g., the gate is open, measurement is full, measurement is empty, or another similar condition. The mobile communication device 102 may be broadcasting a wireless signal from the short-range radio transceiver 112 with an area of coverage 210. The overlap between the area of coverage 210 of the mobile communication device 102 and the area of coverages 220A, 220B, and 220C may establish a communication link.

To establish the communication link, the mobile communication device 102 may be sending out a wireless signal from the short-range radio transceiver 112. The wireless signal may be continuous or may be periodic. The wireless data device 108A, 108B, and 108C may receive the wireless signal via the antenna 140 with the short-range radio transceiver 132 on each device. The wireless data device 108 may then send a wireless signal to the mobile communication device 102 to establish a wireless communication link.

The wireless communication link may be established by the wireless data device 108 by sending a password to the mobile communication device 102. The mobile communication device 102 validates the password then sends a password to the wireless data device 108. The wireless data device 108 validates the password then establishes a secure encrypted wireless communication link and sends the data to the mobile communication device 102. The data from the wireless data device 108 may include identification, data gathered from sensors, data gathered from other wireless data devices, data gathered from other mobile communication devices, and instructions. The mobile communication device 102 may send location data and instructions. The wireless data device 108 may act on the instructions. For example, the wireless data device 108 may stop broadcasting for a specified time period, switch from active broadcasting to passive monitoring, erase data stored, reset sensors 138, enter a sleep mode, or any other similar change in device status.

The mobile communication device 102 may establish a wireless communication link with the long-range radio transceiver 128 to a cell site 122 to transfer the data from the device monitoring application 116 to the server 126 via network 104. The cell site 122 may provide a wireless communication link to the mobile communication device 102 and couple the mobile communication device 102 to the network 104. However, the mobile communication device 102 may be outside of the range of the cell site 122 and unable to establish a wireless communication link. The mobile communication device 102 stores the data inside the non-transitory memory 118 until a wireless communication link can be established.

In an embodiment, wireless communication system 200 may establish a secure communication session by prompting for permission from the user with the device monitoring application 116 on the mobile communication device 102. In an embodiment, the wireless communication system 200 may establish a secure communication session in the background without prompting the user. In an embodiment, the wireless data device 108 may be in a static location. In an embodiment, the wireless communication system 200 may approximate the user's location based on two static wireless data device 108 locations. In an embodiment, the wireless communication system 100 may triangulate the location of the user based on three wireless data device 108 locations.

Figure 4A:
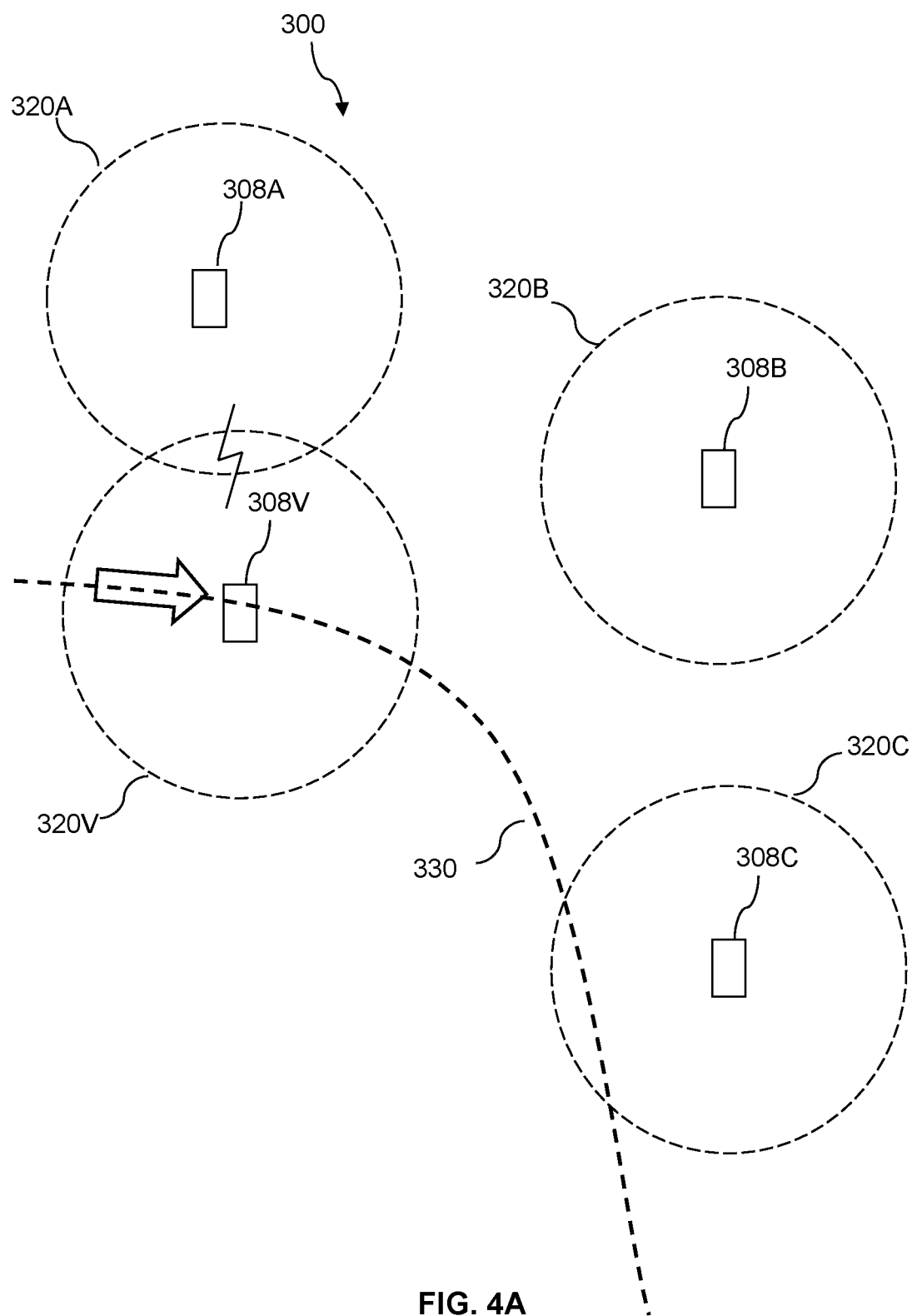
FIG. 4A-B is a block diagram of a communication system according to an embodiment of the disclosure.

Turning now to FIG. 4A, an embodiment of the wireless communication system 300 with multiple wireless data devices 308 is described. A wireless data device 308V may be attached to a movable object such as a vehicle and moving along a path 330. The traveling wireless data device 308V may move into an area with multiple wireless data devices 308A, 308B, and 308C. Although the wireless data device 308 is described, any wireless data device configuration from FIG. 1, FIG. 2, or FIG. 3 may be used. Although three other wireless data devices 308 are shown, any number of wireless data devices 308 may be present. Although only the wireless data devices 308 are shown, it is understood that the wireless data devices 308A, 308B, and 308C may be installed inside a monitored device 106: appliance, equipment, vehicle, or connected to another device without limiting the disclosure. The wireless data devices 308 may be gathering periodic data from the monitored device 106 an/or the environment. The area of coverage from the short-range radio transceiver 132 on the wireless data device 308 discussed in FIG. 2 may be represented by the dotted line circle 320. Likewise, the area of coverage 320V from the short-range radio transceiver 132 on the traveling wireless data device 308V may be represented by the dotted lines.

The wireless data devices 308A, 308B, and 308C may be periodically signaling a wireless request to establish a connection as described in FIG. 3. A traveling wireless data device 308V may establish communication with wireless data device 308A as the area of coverage 320V intersects with the area of coverage 320A. The communication link may be established by the wireless data device 308V sending a password to the wireless data device 308A. The wireless data device 308A validates the password then sends a password to the wireless data device 308V. The wireless data device 308V validates the password then establishes a secure encrypted communication link. The traveling wireless data device 308V may receive the data from 308A, may give data to 308A, or both give and receive data. The data may include identification, data gathered from sensors, data gathered from other wireless data devices, data gathered from other mobile communication devices, and instructions.

The traveling wireless data device 308V may repeat the steps when the wireless data device 308V encounters wireless data device 408B and 408C as it travels along path 330.

Figure 4B:
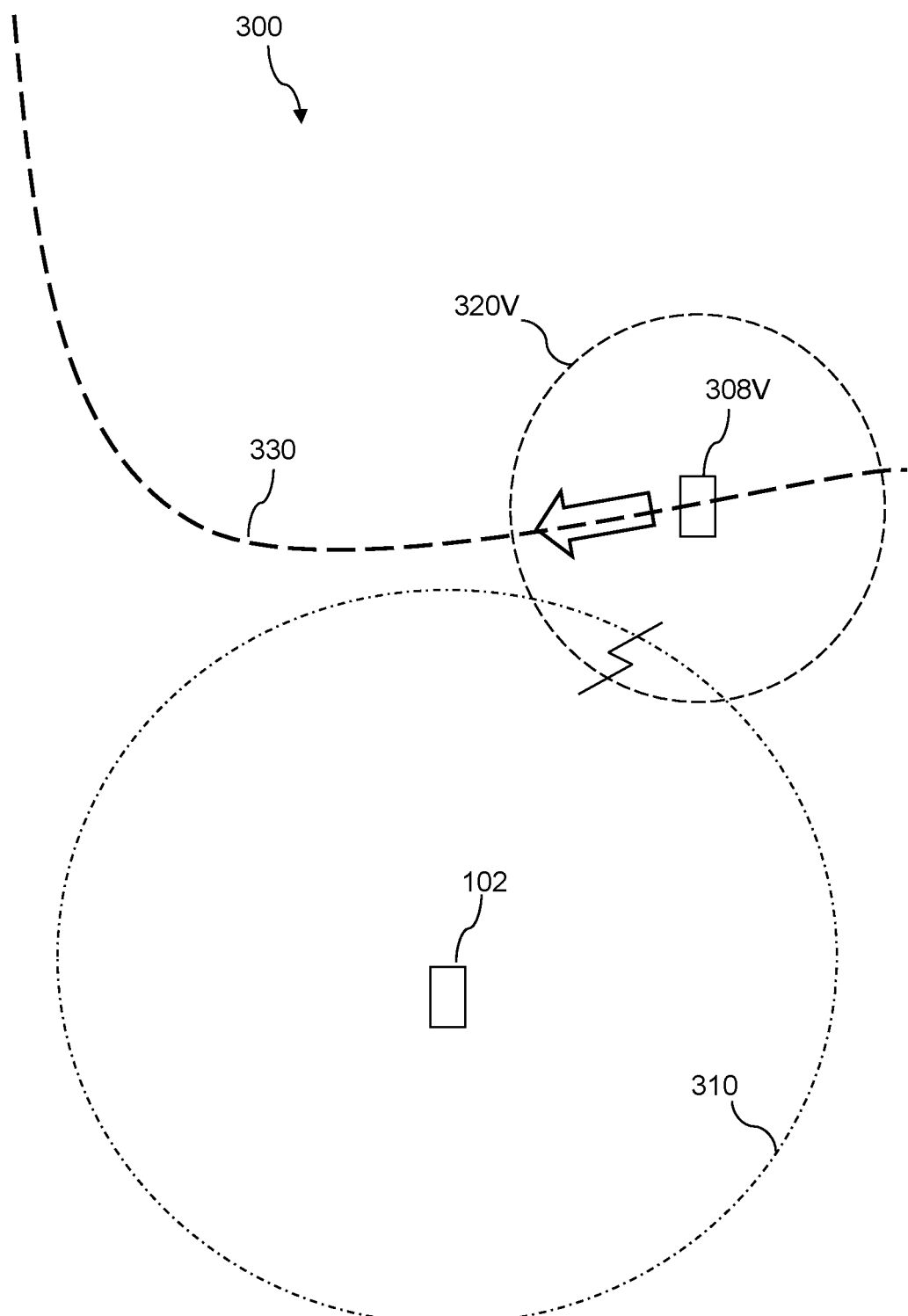

Turning now to FIG. 4B, the traveling wireless data device 308V may connect with mobile communication device 102. The area of coverage 320V of the traveling wireless data device 308V may intersect the area of coverage 310 of the mobile communication device 102 as it travels along path 330. The communication link may be established by the wireless data device 308V sending a password to the mobile communication device 102. The mobile communication device 102 validates the password then sends a password to the wireless data device 308V. The wireless data device 308V validates the password then establishes a secure encrypted communication link and sends the data to the mobile communication device 102. The data from the wireless data device 308V may include identification, data gathered from sensors, data gathered from other wireless data devices (308A, 308B, and 308C) and data gathered from other mobile communication devices, and instructions. The mobile communication device 102 may send location data and instructions to the traveling wireless data device 308V. The wireless data device 308V may act on the instructions. For example, the wireless data device 308V may stop broadcasting for a specified time period, switch from active broadcasting to passive monitoring, erase data stored, reset sensors 138, enter a sleep mode, or any other similar change in device status.

The mobile communication device 102 may establish a connection with the long-range radio transceiver 128 to a cell site 122 to transfer the data from the device monitoring application 116 to the server 126 via network 104. The cell site 122 may provide a wireless communication link to the mobile communication device 102 and couple the mobile communication device 102 to the network 104. However, the mobile communication device 102 may be outside of the range of the cell site 122 and unable to establish a wireless communication link. The mobile communication device 102 stores the data inside the non-transitory memory 118 until a wireless communication link can be established.

Although wireless data devices 308A, 308B, and 308C are described as continuously wireless signaling for making a connection, the wireless data devices may be passive and monitoring for a wireless signal to activate the connection process. In an embodiment, the traveling wireless data device 308V may begin continuously wireless signaling after a condition is met. In an embodiment, the wireless data devices 308A, 308B, and 308C may begin continuously wireless signaling after a condition is met.

Figure 5:
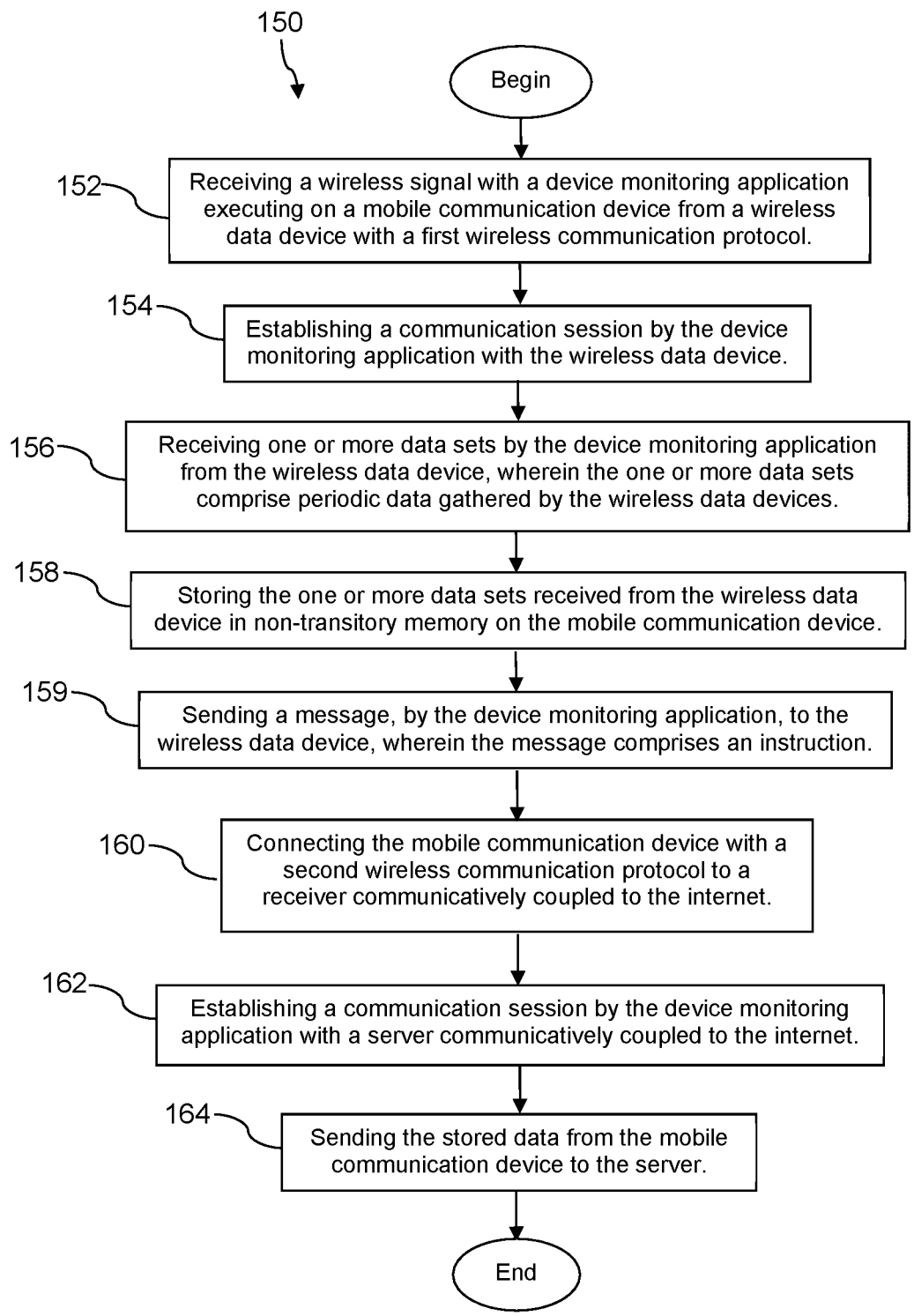
FIG. 5 is a flow chart of a method according to an embodiment of the disclosure.

Turning now to FIG. 5, a method 150 is described. In an embodiment, the method 150 is a method of communicating data from a wireless data device. At block 152, the method 150 comprises receiving a wireless signal with a device monitoring application executing on a mobile communication device from a wireless data device with a first wireless communication protocol. In an embodiment, the wireless data device is installed inside or integrated into monitored equipment.

At block 154, the method 150 comprises establishing a communication session by the device monitoring application with the wireless data device. At block 156, the method 150 comprises receiving one or more data sets by the device monitoring application from the wireless data device, wherein one or more data sets comprise periodic data gathered by the wireless data device. At block 158, the method 150 comprises storing the one or more data sets received from the wireless data device in non-transitory memory on the mobile communication device. At block 159, the method 150 comprises sending a message, by the device monitoring application, to the wireless data device, wherein the message comprises an instruction.

At block 160, the method 150 comprises connecting the mobile communication device with a second wireless communication protocol to a receiver communicatively coupled to the internet. In an embodiment, the receiver is a cell site. In an embodiment, the receiver is a WiFi modem. In an embodiment, the internet is a network. In an embodiment, the internet is a private network, a public network, or a combination of both. At block 162, the method 150 comprises establishing a communication session by the device monitoring application with a server communicatively coupled to the internet. At block 164, the method 150 comprises sending the stored data from the mobile communication device to the server.

Figure 6:
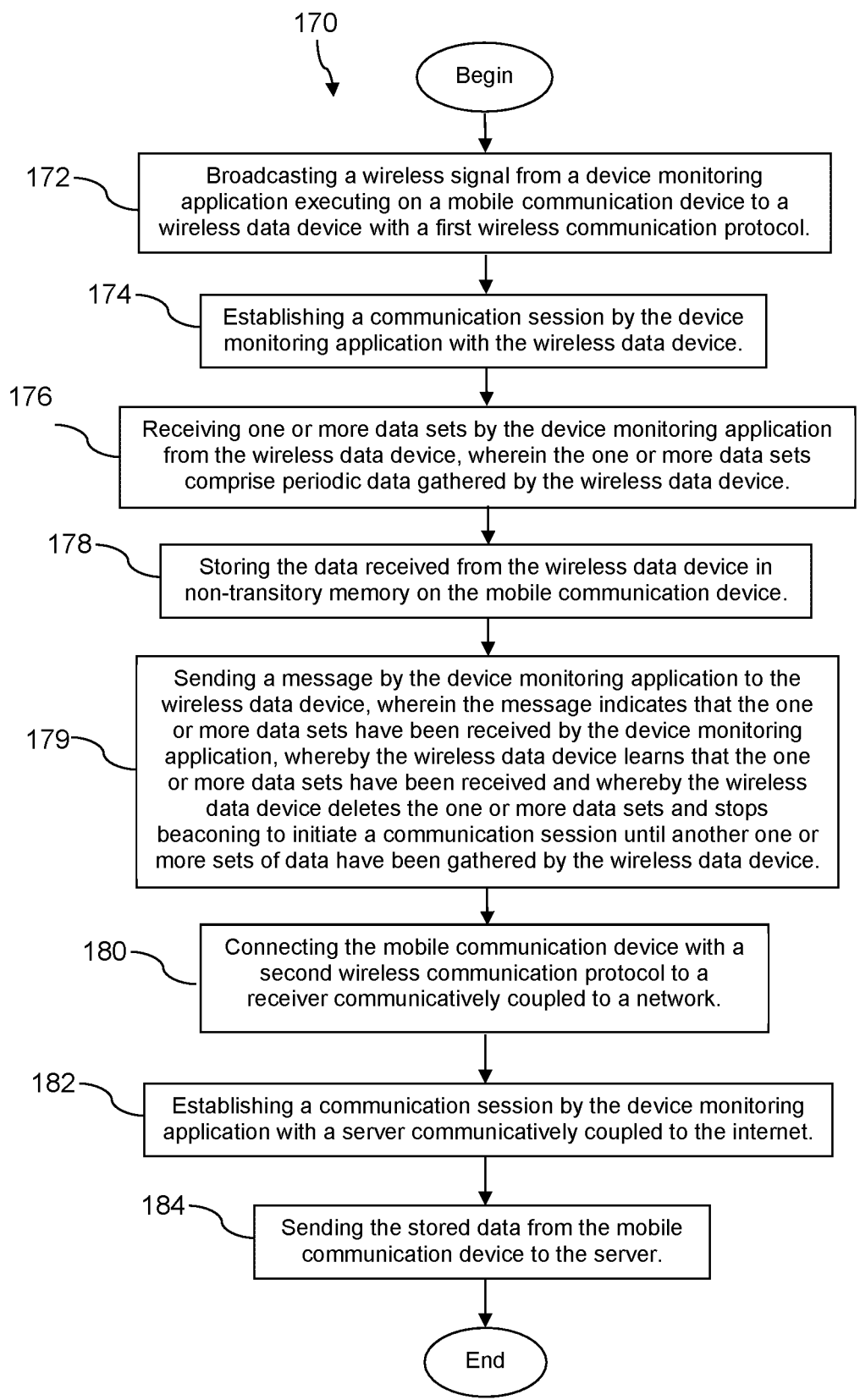
FIG. 6 is a flow chart of a method according to an embodiment of the disclosure.

Turning now to FIG. 6, a method 170 is described. In an embodiment, the method 170 is a method of communicating data from a wireless data device. At block 172, the method 170 comprises broadcasting a wireless signal from a device monitoring application executing on a mobile communication device to a wireless data device with a first wireless communication protocol. In an embodiment, the wireless data device is installed inside or integrated into a monitored device.

At block 174, the method 170 comprises establishing a communication session by the device monitoring application with the wireless data device. At block 176, the method 170 comprises receiving one or more data sets by the device monitoring application from the wireless data device, wherein the one or more data sets comprise periodic data gathered by the wireless data device. At block 178, the method 170 comprises storing the one or more data sets received from the wireless data device in non-transitory memory on the mobile communication device. At block 179, the method 170 comprises sending a message by the device monitoring application to the wireless data device, wherein the message indicates that the one or more data sets have been received by the device monitoring application, whereby the wireless data device learns that the one or more data sets have been received and whereby the wireless data device deletes the one or more data sets and stops beaconing to initiate a communication session until another one or more sets of data have been gathered by the wireless data device.

At block 180, the method 170 comprises connecting the mobile communication device with a second wireless communication protocol to a receiver communicatively coupled to the internet. In an embodiment, the receiver is a cell site. In an embodiment, the receiver is a WiFi modem. In an embodiment, the internet is a network. In an embodiment, the internet is a private network, a public network, or a combination of both. At block 182, the method 170 comprises establishing a communication session by the device monitoring application with a server communicatively coupled to the internet. At block 184, the method 170 comprises sending the stored data from the mobile communication device to the server.

Figure 7:
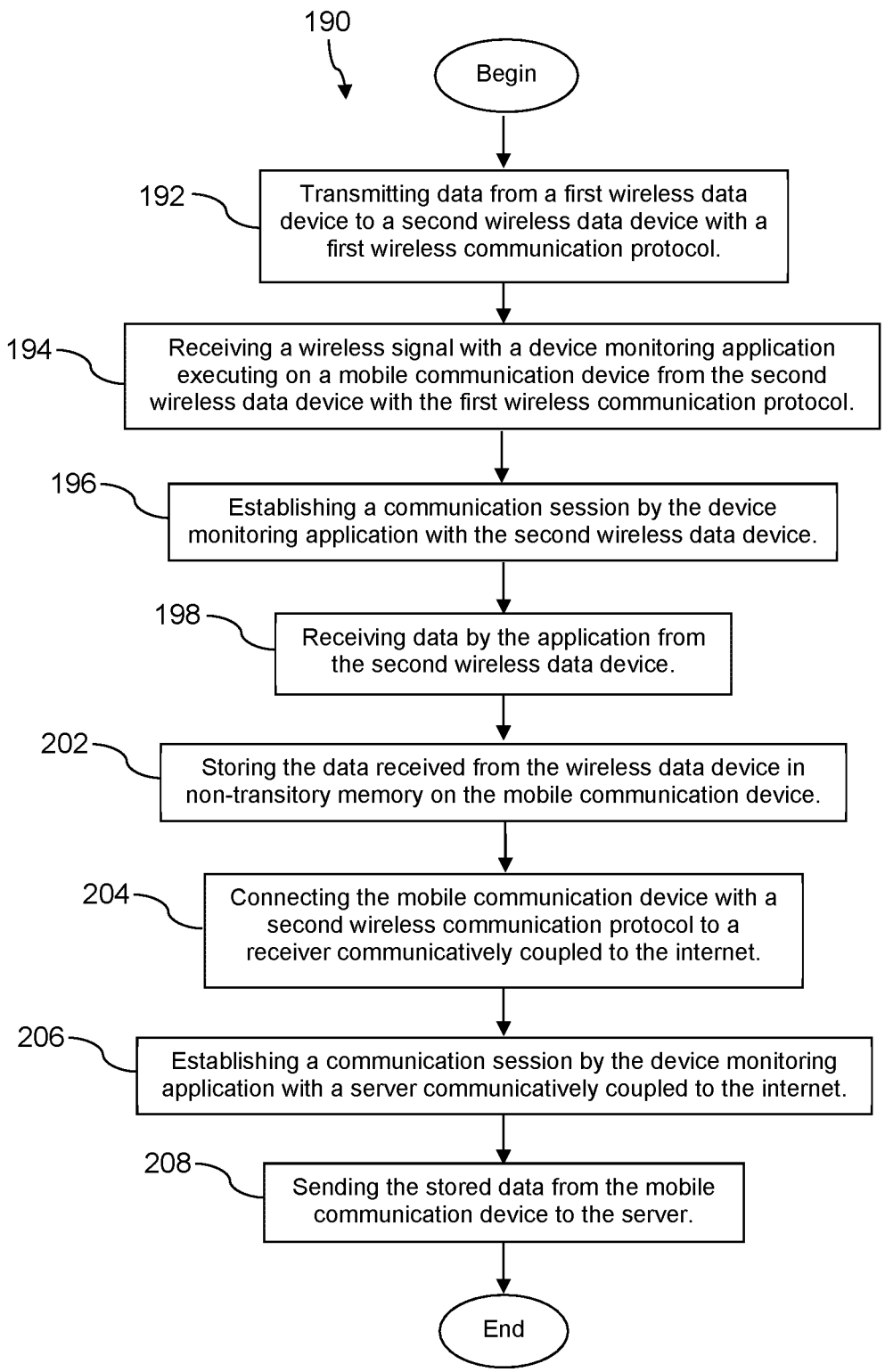
FIG. 7 is a flow chart of a method according to an embodiment of the disclosure.

Turning now to FIG. 7, a method 190 is described. In an embodiment, the method 190 is a method of communicating data from a wireless data device. At block 192, the method 190 comprises transmitting data from a first wireless data device to a second wireless data device with a first wireless communication protocol. In an embodiment, the wireless data device is installed inside or integrated into a monitored device. In an embodiment, the first wireless data device is installed inside a vehicle. In an embodiment, the second wireless data device is installed onto a vehicle.

At block 194, the method 190 comprises receiving a wireless signal with a device monitoring application executing on a mobile communication device from a second wireless data device with a first wireless communication protocol.

At block 196, the method 190 comprises establishing a communication session by the device monitoring application with the second wireless data device. At block 198, the method 190 comprises receiving data by the device monitoring application from the second wireless data device. At block 202, the method 190 comprises storing the data received from the wireless data device in non-transitory memory on the mobile communication device.

At block 204, the method 190 comprises connecting the mobile communication device with a second wireless communication protocol to a receiver communicatively coupled to the internet. In an embodiment, the receiver is a cell site. In an embodiment, the receiver is a WiFi modem. In an embodiment, the internet is a private network, a public network, or a combination of both. At block 206, the method 190 comprises establishing a communication session by the device monitoring application with a server communicatively coupled to the internet. At block 208, the method 190 comprises sending the stored data from the mobile communication device to the server.

Figure 8:
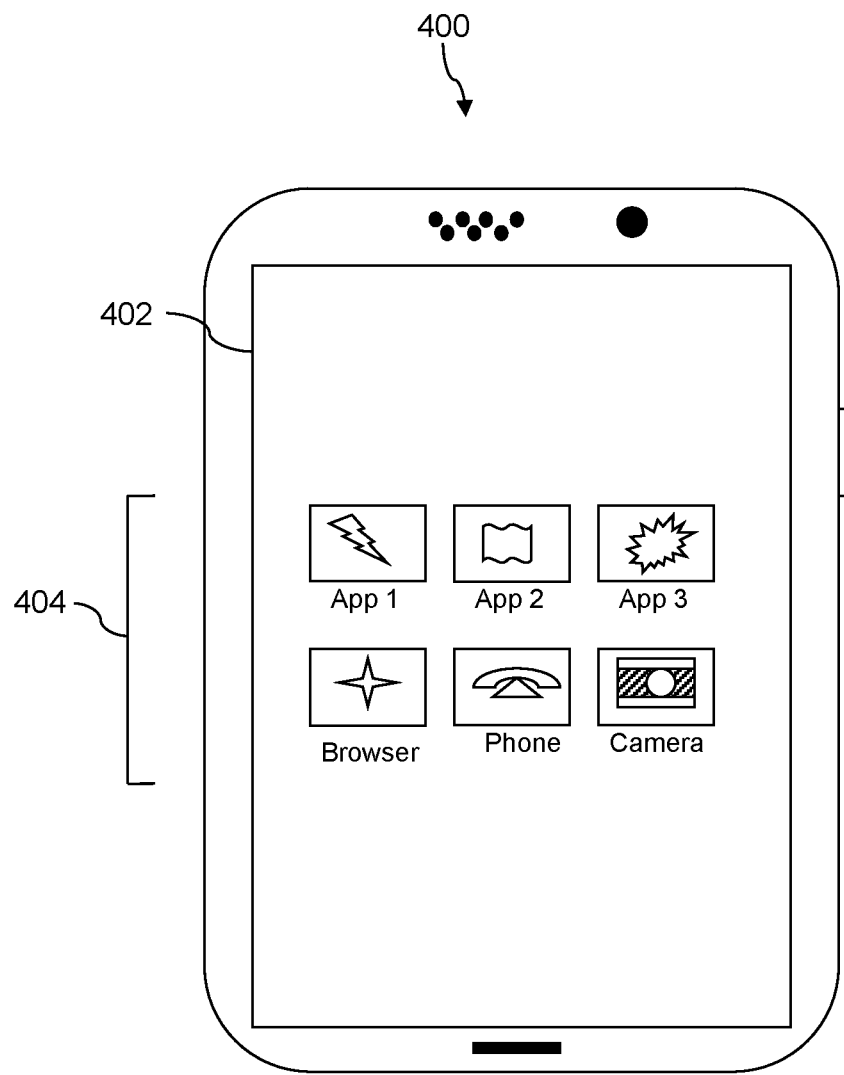
FIG. 8 is an illustration of a mobile communication device according to an embodiment of the disclosure.

FIG. 8 depicts the user equipment (UE) 400, which is operable for implementing aspects of the present disclosure, but the present disclosure should not be limited to these implementations. Though illustrated as a mobile phone, the UE 400 may take various forms including a wireless handset, a pager, a personal digital assistant (PDA), a gaming device, or a media player. The UE 400 includes a touch screen display 402 having a touch-sensitive surface for input by a user. A small number of application icons 404 are illustrated within the touch screen display 402. It is understood that in different embodiments, any number of application icons 404 may be presented in the touch screen display 402. In some embodiments of the UE 400, a user may be able to download and install additional applications on the UE 400, and an icon associated with such downloaded and installed applications may be added to the touch screen display 402 or to an alternative screen. The UE 400 may have other components such as electro-mechanical switches, speakers, camera lenses, microphones, input and/or output connectors, and other components as are well known in the art. The UE 400 may present options for the user to select, controls for the user to actuate, and/or cursors or other indicators for the user to direct. The UE 400 may further accept data entry from the user, including numbers to dial or various parameter values for configuring the operation of the handset. The UE 400 may further execute one or more software or firmware applications in response to user commands. These applications may configure the UE 400 to perform various customized functions in response to user interaction. Additionally, the UE 400 may be programmed and/or configured over-the-air, for example from a wireless base station, a wireless access point, or a peer UE 400. The UE 400 may execute a web browser application which enables the touch screen display 402 to show a web page. The web page may be obtained via wireless communications with a base transceiver station, a wireless network access node, a peer UE 400, or any other wireless communication network or system.

Figure 9:
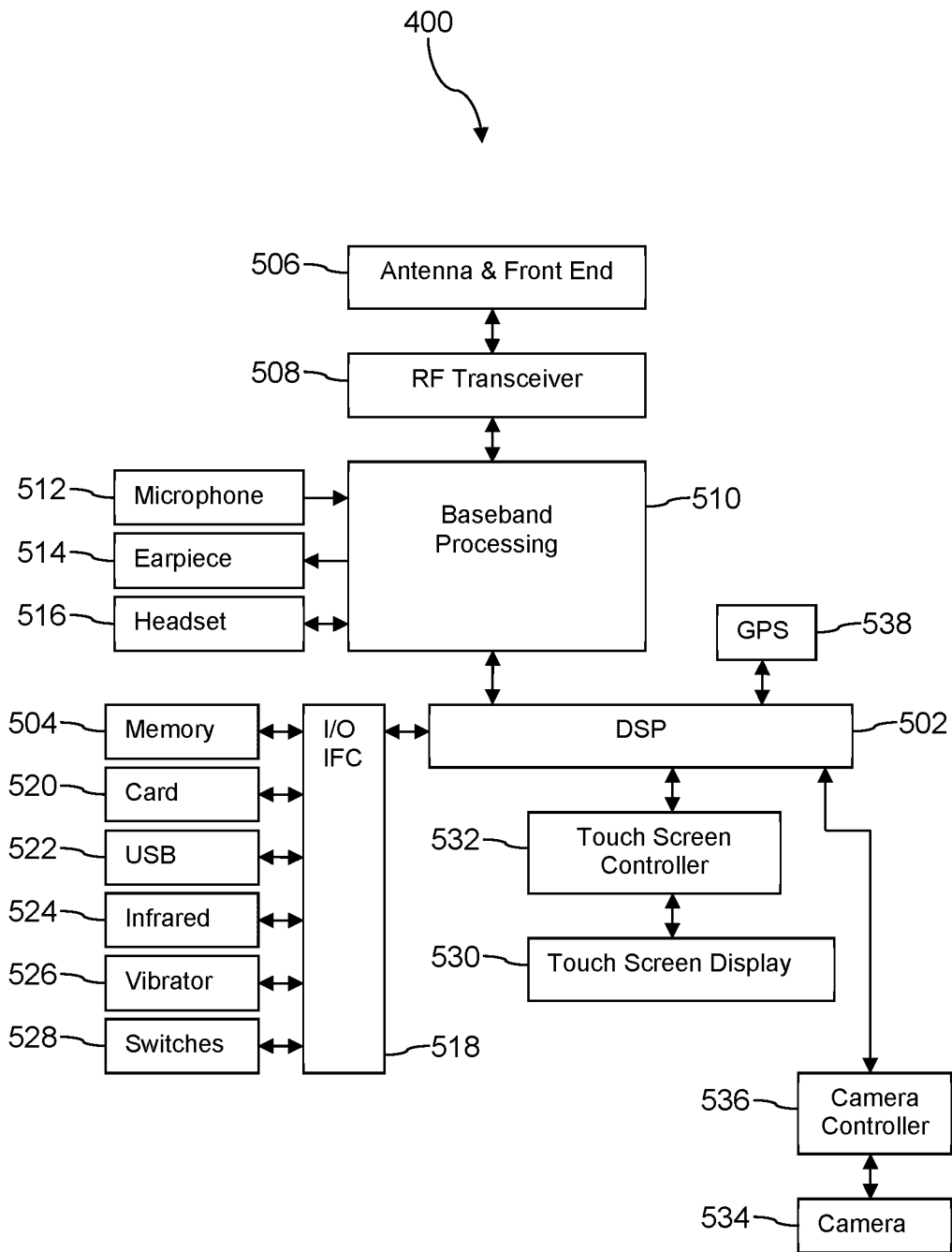
FIG. 9 is a block diagram of a hardware architecture of a mobile communication device according to an embodiment of the disclosure.

FIG. 9 shows a block diagram of the UE 400. While a variety of known components of handsets are depicted, in an embodiment, a subset of the listed components and/or additional components not listed may be included in the UE 400. The UE 400 includes a digital wireless signal processor (DSP) 502 and a memory 504. As shown, the UE 400 may further include one or more antenna and front end unit 506, a one or more radio frequency (RF) transceiver 508, a baseband processing unit 510, a microphone 512, an earpiece speaker 514, a headset port 516, an input/output interface 518, a removable memory card 520, a universal serial bus (USB) port 522, an infrared port 524, a vibrator 526, one or more electro-mechanical switches 528, a touch screen display 530, a touch screen controller 532, a camera 534, a camera controller 536, and a global positioning system (GPS) receiver 538. In an embodiment, the UE 400 may include another kind of display that does not provide a touch-sensitive screen. In an embodiment, the UE 400 may include both the touch screen display 530 and an additional display component that does not provide a touch-sensitive screen. In an embodiment, the DSP 502 may communicate directly with the memory 504 without passing through the input/output interface 518. Additionally, in an embodiment, the UE 400 may comprise other peripheral devices that provide other functionality.

The DSP 502 or some other form of controller or central processing unit operates to control the various components of the UE 400 in accordance with embedded software or firmware stored in memory 504 or stored in memory contained within the DSP 502 itself. In addition to the embedded software or firmware, the DSP 502 may execute other applications stored in the memory 504 or made available via information carrier media such as portable data storage media like the removable memory card 520 or via wired or wireless network communications. The application software may comprise a compiled set of machine-readable instructions that configure the DSP 502 to provide the desired functionality, or the application software may be high-level software instructions to be processed by an interpreter or compiler to indirectly configure the DSP 502.

The DSP 502 may communicate with a wireless network via the analog baseband processing unit 510. In some embodiments, the communication may provide Internet connectivity, enabling a user to gain access to content on the internet and to send and receive e-mail or text messages. The input/output interface 518 interconnects the DSP 502 and various memories and interfaces. The memory 504 and the removable memory card 520 may provide software and data to configure the operation of the DSP 502. Among the interfaces may be the USB port 522 and the infrared port 524. The USB port 522 may enable the UE 400 to function as a peripheral device to exchange information with a personal computer or other computer systems. The infrared port 524 and other optional ports such as a Bluetooth® interface or an IEEE 802.11 compliant wireless interface may enable the UE 400 to communicate wirelessly with other nearby handsets and/or wireless base stations.

In an embodiment, one or more of the radio transceivers is a cellular radio transceiver. A cellular radio transceiver promotes establishing a wireless communication link with a cell site according to one or more of a 5G, a long term evolution (LTE), a code division multiple access (CDMA), a global system for mobile communications (GSM) wireless communication protocol. In an embodiment, one of the radio transceivers 508 may comprise a near field communication (NFC) transceiver. The NFC transceiver may be used to complete payment transactions with point-of-sale terminals or other communications exchanges. In an embodiment, each of the different radio transceivers 508 may be coupled to its own separate antenna. In an embodiment, the UE 400 may comprise a radio frequency identify (RFID) reader and/or writer device.

The switches 528 may couple to the DSP 502 via the input/output interface 518 to provide one mechanism for the user to provide input to the UE 400. Alternatively, one or more of the switches 528 may be coupled to a motherboard of the UE 400 and/or to components of the UE 400 via a different path (e.g., not via the input/output interface 518), for example, coupled to a power control circuit (power button) of the UE 400. The touch screen display 530 is another input mechanism, which further displays text and/or graphics to the user. The touch screen LCD controller 532 couples the DSP 502 to the touch screen display 530. The GPS receiver 538 is coupled to the DSP 502 to decode global positioning system wireless signals, thereby enabling the UE 400 to determine its position.

Figure 10A:
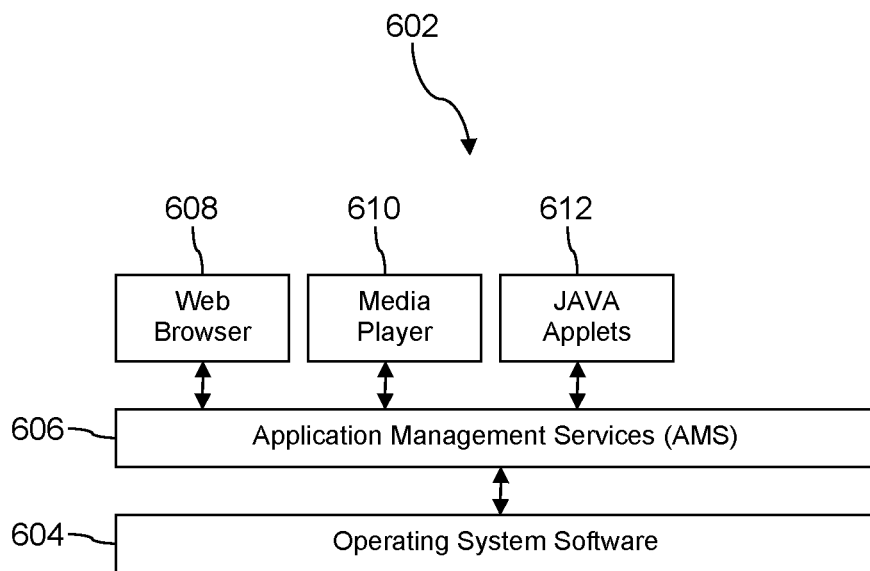
FIG. 10A is a block diagram of a software architecture of a mobile communication device according to an embodiment of the disclosure.

FIG. 10A illustrates a software environment 602 that may be implemented by the DSP 502. The DSP 502 executes operating system software 604 that provides a platform from which the rest of the software operates. The operating system software 604 may provide a variety of drivers for the handset hardware with standardized interfaces that are accessible to application software. The operating system software 604 may be coupled to and interact with application management services (AMS) 606 that transfer control between applications 614 running on the UE 400. Also shown in FIG. 10A are a web browser application 608, a media player application 610, and JAVA applets 612. The web browser application 608 may be executed by the UE 400 to browse content and/or the internet, for example, when the UE 400 is coupled to a network via a wireless link. The web browser application 608 may permit a user to enter information into forms and select links to retrieve and view web pages. The media player application 610 may be executed by the UE 400 to play audio or audiovisual media. The JAVA applets 612 may be executed by the UE 400 to provide a variety of functionality including games, utilities, and other functionality.

Figure 10B:
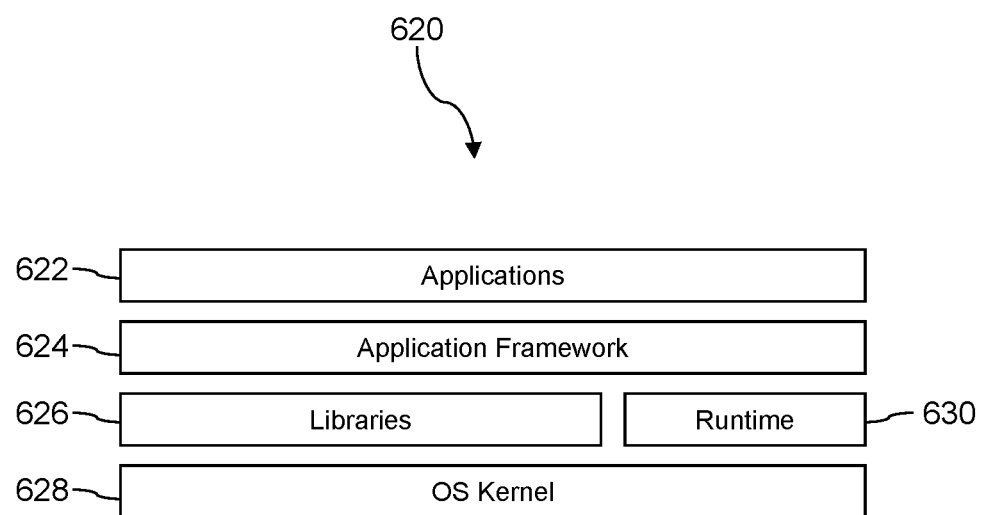
FIG. 10B is a block diagram of another software architecture of a mobile communication device according to an embodiment of the disclosure.

FIG. 10B illustrates an alternative software environment 620 that may be implemented by the DSP 502. The DSP 502 executes operating system kernel (OS kernel) 628 and an execution runtime 630. The DSP 502 executes applications 622 that may execute in the execution runtime 630 and may rely upon services provided by the application framework 624. Applications 622 and the application framework 624 may rely upon functionality provided via the libraries 626.

Figure 11:
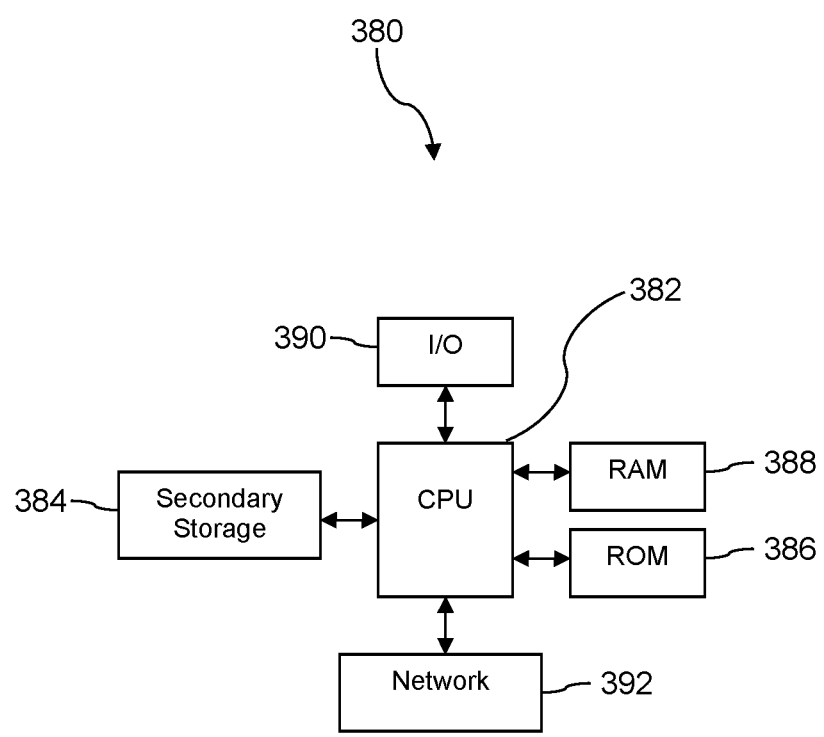
FIG. 11 is a block diagram of a computer system according to an embodiment of the disclosure.

FIG. 11 illustrates a computer system 380 suitable for implementing one or more embodiments disclosed herein. The computer system 380 includes a processor 382 (which may be referred to as a central processor unit or CPU) that is in communication with memory devices including secondary storage 384, read only memory (ROM) 386, random access memory (RAM) 388, input/output (I/O) devices 390, and network connectivity devices 392. The processor 382 may be implemented as one or more CPU chips.

It is understood that by programming and/or loading executable instructions onto the computer system 380, at least one of the CPU 382, the RAM 388, and the ROM 386 are changed, transforming the computer system 380 in part into a particular machine or apparatus having the novel functionality taught by the present disclosure. It is fundamental to the electrical engineering and software engineering arts that functionality that can be implemented by loading executable software into a computer can be converted to a hardware implementation by well-known design rules. Decisions between implementing a concept in software versus hardware typically hinge on considerations of stability of the design and numbers of units to be produced rather than any issues involved in translating from the software domain to the hardware domain. Generally, a design that is still subject to frequent change may be preferred to be implemented in software, because re-spinning a hardware implementation is more expensive than re-spinning a software design. Generally, a design that is stable that will be produced in large volume may be preferred to be implemented in hardware, for example, in an application specific integrated circuit (ASIC), because for large production runs the hardware implementation may be less expensive than the software implementation. Often a design may be developed and tested in a software form and later transformed, by well-known design rules, to an equivalent hardware implementation in an application specific integrated circuit that hardwires the instructions of the software. In the same manner as a machine controlled by a new ASIC is a particular machine or apparatus, likewise a computer that has been programmed and/or loaded with executable instructions may be viewed as a particular machine or apparatus.

Additionally, after the computer system 380 is turned on or booted, the CPU 382 may execute a computer program or application. For example, the CPU 382 may execute software or firmware stored in the ROM 386 or stored in the RAM 388. In some cases, on boot and/or when the application is initiated, the CPU 382 may copy the application or portions of the application from the secondary storage 384 to the RAM 388 or to memory space within the CPU 382 itself, and the CPU 382 may then execute instructions that the application is comprised of. In some cases, the CPU 382 may copy the application or portions of the application from memory accessed via the network connectivity devices 392 or via the I/O devices 390 to the RAM 388 or to memory space within the CPU 382, and the CPU 382 may then execute instructions that the application is comprised of. During execution, an application may load instructions into the CPU 382, for example, load some of the instructions of the application into a cache of the CPU 382. In some contexts, an application that is executed may be said to configure the CPU 382 to do something, e.g., to configure the CPU 382 to perform the function or functions promoted by the subject application. When the CPU 382 is configured in this way by the application, the CPU 382 becomes a specific purpose computer or a specific purpose machine.

The secondary storage 384 is typically comprised of one or more disk drives or tape drives and is used for non-volatile storage of data and as an over-flow data storage device if RAM 388 is not large enough to hold all working data. Secondary storage 384 may be used to store programs which are loaded into RAM 388 when such programs are selected for execution. The ROM 386 is used to store instructions and perhaps data which are read during program execution. ROM 386 is a non-volatile memory device which typically has a small memory capacity relative to the larger memory capacity of secondary storage 384. The RAM 388 is used to store volatile data and perhaps to store instructions. Access to both ROM 386 and RAM 388 is typically faster than to secondary storage 384. The secondary storage 384, the RAM 388, and/or the ROM 386 may be referred to in some contexts as computer readable storage media and/or non-transitory computer readable media.

I/O devices 390 may include printers, video monitors, liquid crystal displays (LCDs), touch screen displays, keyboards, keypads, switches, dials, mice, trackballs, voice recognizers, card readers, paper tape readers, or other well-known input devices.

The network connectivity devices 392 may take the form of modems, modem banks, Ethernet cards, universal serial bus (USB) interface cards, serial interfaces, token ring cards, fiber distributed data interface (FDDI) cards, wireless local area network (WLAN) cards, radio transceiver cards, and/or other well-known network devices. The network connectivity devices 392 may provide wired communication links and/or wireless communication links (e.g., a first network connectivity device 392 may provide a wired communication link and a second network connectivity device 392 may provide a wireless communication link). Wired communication links may be provided in accordance with Ethernet (IEEE 802.3), Internet protocol (IP), time division multiplex (TDM), data over cable service interface specification (DOCSIS), wavelength division multiplexing (WDM), and/or the like. In an embodiment, the radio transceiver cards may provide wireless communication links using protocols such as code division multiple access (CDMA), global system for mobile communications (GSM), long-term evolution (LTE), WiFi (IEEE 802.11), Bluetooth, Zigbee, narrowband Internet of things (NB IoT), near field communications (NFC), radio frequency identity (RFID). The radio transceiver cards may promote radio communications using 5G, 5G New Radio, or 5G LTE radio communication protocols. These network connectivity devices 392 may enable the processor 382 to communicate with the internet or one or more intranets. With such a network connection, it is contemplated that the processor 382 might receive information from the network, or might output information to the network in the course of performing the above-described method steps. Such information, which is often represented as a sequence of instructions to be executed using processor 382, may be received from and outputted to the network, for example, in the form of a computer data wireless signal embodied in a carrier wave.

Such information, which may include data or instructions to be executed using processor 382 for example, may be received from and outputted to the network, for example, in the form of a computer data baseband wireless signal or wireless signal embodied in a carrier wave. The baseband wireless signal or wireless signal embodied in the carrier wave, or other types of wireless signals currently used or hereafter developed, may be generated according to several methods well-known to one skilled in the art. The baseband wireless signal and/or wireless signal embedded in the carrier wave may be referred to in some contexts as a transitory wireless signal.

The processor 382 executes instructions, codes, computer programs, scripts which it accesses from hard disk, floppy disk, optical disk (these various disk based systems may all be considered secondary storage 384), flash drive, ROM 386, RAM 388, or the network connectivity devices 392. While only one processor 382 is shown, multiple processors may be present. Thus, while instructions may be discussed as executed by a processor, the instructions may be executed simultaneously, serially, or otherwise executed by one or multiple processors. Instructions, codes, computer programs, scripts, and/or data that may be accessed from the secondary storage 384, for example, hard drives, floppy disks, optical disks, and/or other devices, the ROM 386, and/or the RAM 388 may be referred to in some contexts as non-transitory instructions and/or non-transitory information.

In an embodiment, the computer system 380 may comprise two or more computers in communication with each other that collaborate to perform a task. For example, but not by way of limitation, an application may be partitioned in such a way as to permit concurrent and/or parallel processing of the instructions of the application. Alternatively, the data processed by the application may be partitioned in such a way as to permit concurrent and/or parallel processing of different portions of a data set by the two or more computers. In an embodiment, virtualization software may be employed by the computer system 380 to provide the functionality of a number of servers that is not directly bound to the number of computers in the computer system 380. For example, virtualization software may provide twenty virtual servers on four physical computers. In an embodiment, the functionality disclosed above may be provided by executing the application and/or applications in a cloud computing environment. Cloud computing may comprise providing computing services via a network connection using dynamically scalable computing resources. Cloud computing may be supported, at least in part, by virtualization software. A cloud computing environment may be established by an enterprise and/or may be hired on an as-needed basis from a third party provider. Some cloud computing environments may comprise cloud computing resources owned and operated by the enterprise as well as cloud computing resources hired and/or leased from a third party provider.

In an embodiment, some or all of the functionality disclosed above may be provided as a computer program product. The computer program product may comprise one or more computer readable storage medium having computer-usable program code embodied therein to implement the functionality disclosed above. The computer program product may comprise data structures, executable instructions, and other computer usable program code. The computer program product may be embodied in removable computer storage media and/or non-removable computer storage media. The removable computer readable storage medium may comprise, without limitation, a paper tape, a magnetic tape, magnetic disk, an optical disk, a solid state memory chip, for example, analog magnetic tape, compact disk read only memory (CD-ROM) disks, floppy disks, jump drives, digital cards, multimedia cards, and others. The computer program product may be suitable for loading, by the computer system 380, at least portions of the contents of the computer program product to the secondary storage 384, to the ROM 386, to the RAM 388, and/or to other non-volatile memory and volatile memory of the computer system 380. The processor 382 may process the executable instructions and/or data structures in part by directly accessing the computer program product, for example, by reading from a CD-ROM disk inserted into a disk drive peripheral of the computer system 380. Alternatively, the processor 382 may process the executable instructions and/or data structures by remotely accessing the computer program product, for example, by downloading the executable instructions and/or data structures from a remote server through the network connectivity devices 392. The computer program product may comprise instructions that promote the loading and/or copying of data, data structures, files, and/or executable instructions to the secondary storage 384, to the ROM 386, to the RAM 388, and/or to other non-volatile memory and volatile memory of the computer system 380.

In some contexts, the secondary storage 384, the ROM 386, and the RAM 388 may be referred to as a non-transitory computer readable medium or a computer readable storage media. A dynamic RAM embodiment of the RAM 388, likewise, may be referred to as a non-transitory computer readable medium in that while the dynamic RAM receives electrical power and is operated in accordance with its design, for example during a period of time during which the computer system 380 is turned on and operational, the dynamic RAM stores information that is written to it. Similarly, the processor 382 may comprise an internal RAM, an internal ROM, a cache memory, and/or other internal non-transitory storage blocks, sections, or components that may be referred to in some contexts as non-transitory computer readable media or computer readable storage media.

While several embodiments have been provided in the present disclosure, it should be understood that the disclosed systems and methods may be embodied in many other specific forms without departing from the spirit or scope of the present disclosure. The present examples are to be considered as illustrative and not restrictive, and the intention is not to be limited to the details given herein. For example, the various elements or components may be combined or integrated into another system or certain features may be omitted or not implemented.

Also, techniques, systems, subsystems, and methods described and illustrated in the various embodiments as discrete or separate may be combined or integrated with other systems, modules, techniques, or methods without departing from the scope of the present disclosure. Other items shown or discussed as directly coupled or communicating with each other may be indirectly coupled or communicating through some interface, device, or intermediate component, whether electrically, mechanically, or otherwise. Other examples of changes, substitutions, and alterations are ascertainable by one skilled in the art and could be made without departing from the spirit and scope disclosed herein.

What is claimed is:

1. A method of communicating data from a wireless data device, comprising: receiving a wireless signal with a device monitoring application executing on a mobile communication device from a wireless data device with a first wireless communication protocol; establishing a communication session by the device monitoring application with the wireless data device; receiving one or more data sets by the device monitoring application from the wireless data device, wherein the one or more data sets comprise periodic data gathered by the wireless data device; storing the one or more data sets received from the wireless data device in non-transitory memory on the mobile communication device; sending a message, by the device monitoring application, to the wireless data device, wherein the message comprises an instruction, and wherein the wireless data device stops beaconing to initiate a communication session with mobile communication devices until another one or more sets of data have been gathered by the wireless data device in response to the instruction; connecting the mobile communication device with a second wireless communication protocol to a receiver communicatively coupled to a network; establishing a communication session by the device monitoring application with a server communicatively coupled to the network; and sending the stored data from the mobile communication device to the server.

2. The method of claim 1, further comprising:
exchanging passwords to establish communication between the device monitoring application and the wireless data device.

3. The method of claim 1, further comprising:
storing a location of the mobile communication device with the data received from the wireless data device in non-transitory memory.

4. The method of claim 1, wherein the first wireless communication protocol communicates wirelessly according to at least one of WiFi or Bluetooth.

5. The method of claim 1, wherein the second wireless communication protocol communicates wirelessly according to at least one of a 5G, a long term evolution (LTE), a code division multiple access (CDMA), or a global system for mobile communications (GSM) telecommunications protocol.

6. The method of claim 1, wherein the mobile communication device is one of a smartphone, a mobile phone, a laptop computer, a tablet computer, a wireless handset, a personal digital assistant (PDA), a gaming device, a pager, a media player, or a computer.

7. The method of claim 1, wherein the second wireless communication protocol communicates wirelessly according to least one of WiFi or Bluetooth.

8. A method of communicating data from a wireless data device, comprising: broadcasting a wireless signal from a device monitoring application executing on a mobile communication device to a wireless data device with a first wireless communication protocol; establishing a communication session by the device monitoring application with the wireless data device; receiving one or more data sets by the device monitoring application from the wireless data device, wherein the one or more data sets comprise periodic data gathered by the wireless data device; storing the one or more data sets received from the wireless data device in non-transitory memory on the mobile communication device; sending a message by the device monitoring application to the wireless data device, wherein the message comprises an instruction and indicates that the one or more data sets have been received by the device monitoring application, wherein the wireless data device deletes the one or more data sets and stops beaconing to initiate a communication session with mobile communication devices until another one or more sets of data have been gathered by the wireless data device in response to the instruction; connecting the mobile communication device with a second wireless communication protocol to a receiver communicatively coupled to a network; establishing a communication session by the device monitoring application with a server communicatively coupled to the network; and sending the stored data from the mobile communication device to the server.

9. The method of claim 8, further comprising:
storing a location of the mobile communication device with the data received from the wireless data device in non-transitory memory.

10. The method of claim 8, wherein the first wireless communication protocol communicates wirelessly according to at least one of WiFi or Bluetooth.

11. The method of claim 8, wherein the second wireless communication protocol communicates wirelessly according to at least one of a 5G, a long term evolution (LTE), a code division multiple access (CDMA), or a global system for mobile communications (GSM) telecommunications protocol.

12. The method of claim 8, wherein the mobile communication device is one of a smartphone, a mobile phone, a laptop computer, a tablet computer, a wireless handset, a personal digital assistant (PDA), a gaming device, a pager, a media player, or a computer.

13. The method of claim 8, wherein the second wireless communication protocol communicates wirelessly according to least one of WiFi or Bluetooth.

14. A method of communicating data from a wireless data device, comprising: transmitting data from a first wireless data device to a second wireless data device with a first wireless communication protocol; receiving a wireless signal with a device monitoring application executing on a mobile communication device from the second wireless data device with the first wireless communication protocol; establishing a communication session by the device monitoring application with the second wireless data device; receiving data by the device monitoring application from the second wireless data device; sending a message, by the device monitoring application, to the second wireless data device, wherein the message comprises an instruction, and wherein the second wireless data device stops beaconing to initiate a communication session with mobile communication devices until another one or more sets of data have been gathered by the second wireless data device in response to the instruction; storing the data received from the second wireless data device in non-transitory memory on the mobile communication device; connecting the mobile communication device with a second wireless communication protocol to a receiver communicatively coupled to a network; establishing a communication session by the device monitoring application with a server communicatively coupled to the network; and sending the stored data from the mobile communication device to the server.

15. The method of claim 14, further comprising:
exchanging passwords to establish communication between the device monitoring application and the wireless data device.

16. The method of claim 14, further comprising:
storing a location of the mobile communication device with the data received from the wireless data device in non-transitory memory.

17. The method of claim 14, wherein the first wireless communication protocol communicates wirelessly according to at least one of WiFi or Bluetooth.

18. The method of claim 14, wherein the second wireless communication protocol communicates wirelessly according to at least one of a 5G, a long term evolution (LTE), a code division multiple access (CDMA), or a global system for mobile communications (GSM) telecommunications protocol.

19. The method of claim 14, wherein the second wireless data device is installed in a movable object.

20. The method of claim 14, wherein the mobile communication device is one of a smartphone, a mobile phone, a laptop computer, a tablet computer, a wireless handset, a personal digital assistant (PDA), a gaming device, a pager, a media player, or a computer.

\* \* \* \* \*